US010482590B2

(12) United States Patent
He et al.

(10) Patent No.: US 10,482,590 B2
(45) Date of Patent: Nov. 19, 2019

(54) METHOD AND SYSTEM FOR DEFECT CLASSIFICATION

(71) Applicant: KLA-Tencor Corporation, Milpitas, CA (US)

(72) Inventors: Li He, San Jose, CA (US); Chien-Huei Adam Chen, San Jose, CA (US); Sankar Venkataraman, Milpitas, CA (US); John R. Jordan, Mountain View, CA (US); Huajun Ying, San Jose, CA (US); Sinha Harsh, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 114 days.

(21) Appl. No.: 15/839,690

(22) Filed: Dec. 12, 2017

(65) Prior Publication Data

US 2018/0114310 A1 Apr. 26, 2018

Related U.S. Application Data

(62) Division of application No. 14/749,316, filed on Jun. 24, 2015, now Pat. No. 9,898,811.

(Continued)

(51) Int. Cl.
*G06K 9/62* (2006.01)
*G06T 7/00* (2017.01)

(52) U.S. Cl.
CPC .......... *G06T 7/0004* (2013.01); *G06K 9/6256* (2013.01); *G06K 9/6292* (2013.01);
(Continued)

(58) Field of Classification Search
CPC ......... G06T 7/0004; G06T 2207/30148; G06T 7/001; G06T 2207/20081; G06K 9/6292;
(Continued)

(56) References Cited

U.S. PATENT DOCUMENTS 6,148,099 A * 11/2000 Lee .................. G06T 7/0006
382/145
6,922,482 B1 7/2005 Ben-Porath
(Continued)

FOREIGN PATENT DOCUMENTS

CN 103198322 A 7/2013
JP 2004-295879 A 10/2004
(Continued)

OTHER PUBLICATIONS

PCT Search Report for International Application No. PCT/US2016/031046 dated Aug. 16, 2016, 3 pages.
(Continued)

*Primary Examiner* — Sheela C Chawan
(74) *Attorney, Agent, or Firm* — Suiter Swantz pc llo

(57) ABSTRACT

Defect classification includes acquiring one or more images of a specimen, receiving a manual classification of one or more training defects based on one or more attributes of the one or more training defects, generating an ensemble learning classifier based on the received manual classification and the attributes of the one or more training defects, generating a confidence threshold for each defect type of the one or more training defects based on a received classification purity requirement, acquiring one or more images including one or more test defects, classifying the one or more test defects with the generated ensemble learning classifier, calculating a confidence level for each of the one or more test defects with the generated ensemble learning classifier and reporting one or more test defects having a confidence level below the generated confidence threshold via the user interface device for manual classification.

15 Claims, 4 Drawing Sheets

Related U.S. Application Data

(60) Provisional application No. 62/158,605, filed on May 8, 2015.

(52) U.S. Cl.
CPC ............... *G06K 2009/6295* (2013.01); *G06T 2207/20081* (2013.01); *G06T 2207/30148* (2013.01)

(58) Field of Classification Search
CPC ......... G06K 9/6256; G06K 2009/6295; G01N 21/95607; G01N 21/9501
See application file for complete search history.

(56) References Cited

U.S. PATENT DOCUMENTS

| | | | |
|---|---|---|---|
| 7,020,536 | B2 | 3/2006 | Lin |
| 7,035,447 | B2 | 4/2006 | Take |
| 7,359,544 | B2 | 4/2008 | Gao |
| 7,602,962 | B2 | 10/2009 | Miyamoto et al. |
| 8,995,747 | B2 | 3/2015 | Xu |
| 9,430,743 | B2 * | 8/2016 | Plihal .................... G06T 7/001 |
| 9,430,824 | B2 * | 8/2016 | Sezginer ............... G06T 7/0008 |
| 10,043,264 | B2 * | 8/2018 | Greenberg ............. G06T 7/001 |
| 10,068,176 | B2 * | 9/2018 | Chan ....................... G06N 5/04 |
| 2004/0156540 | A1 | 8/2004 | Gao et al. |
| 2004/0234120 | A1 | 11/2004 | Honda et al. |
| 2008/0075352 | A1 | 3/2008 | Shibuya et al. |
| 2011/0320149 | A1 | 12/2011 | Lee et al. |
| 2012/0027285 | A1 | 2/2012 | Shlain et al. |
| 2012/0323506 | A1 | 12/2012 | King |
| 2013/0279794 | A1 | 10/2013 | Greenberg et al. |
| 2013/0279795 | A1 * | 10/2013 | Shlain .................. G06T 7/0004 382/149 |

FOREIGN PATENT DOCUMENTS

| | | | |
|---|---|---|---|
| JP | 2008-256466 | A | 10/2008 |
| JP | 2008268232 | A | 11/2008 |

OTHER PUBLICATIONS

Leo Breiman, Machine Learning, Random Forests, Oct. 2001, pp. 5-32, vol. 45, Issue 1, Kluwer Academic Publishers, The Netherlands.

Kulkarni et al., Random Forest Classifiers: A Survey and Future Research Directions, International Journal of Advanced Computing, Apr. 2013, vol. 36, Issue 1, Recent Science Publications.

Search Report and Written Opinion dated Jun. 21, 2018 for Singapore Patent Application No. 11201709003R.

\* cited by examiner

METHOD AND SYSTEM FOR DEFECT CLASSIFICATION

CROSS-REFERENCE TO RELATED APPLICATION

The present application is related to and claims benefit of the earliest available effective filing date from the following applications. The present application constitutes a divisional patent application of U.S. Patent Application entitled METHOD AND SYSTEM FOR DEFECT CLASSIFICATION, naming Li He, Chien-Huei Adam Chen, Sankar Venkataraman, John R. Jordan III, Huajun Ying and Harsh Sinha as inventors, filed Jun. 24, 2015, application Ser. No. 14/749,316, which is a regular (non-provisional) patent application of U.S. Provisional Patent Application entitled METHOD FOR HIGH PURITY DEFECT CLASSIFICATION AND DEFECT DATA ANALYSIS, naming Li He, Chien Huei Adam Chen, Sankar Venkataraman, John R. Jordan III, Huajun Ying and Sinha Harsh as inventors, filed May 8, 2015 Application Ser. No. 62/158,605. U.S. patent application Ser. No. 14/749,316 and U.S. Provisional Patent Application No. 62/158,605 are incorporated by reference herein in their entirety.

TECHNICAL FIELD

The present invention generally relates to defect review and classification, and, in particular, to the automatic generation of a defect classifier that provides high purity defect classification.

BACKGROUND

Fabricating semiconductor devices such as logic and memory devices typically includes processing a substrate such as a semiconductor wafer using a large number of semiconductor fabrication processes to form various features and multiple levels of the semiconductor devices. As semiconductor device size become smaller and smaller, it becomes critical to develop enhanced inspection and review devices and procedures. One such procedure includes classification and analysis of defects on a specimen, such as a wafer. As used throughout the present disclosure, the term "wafer" generally refers to substrates formed of a semiconductor or non-semiconductor material. For example, a semiconductor or non-semiconductor material may include, but are not limited to, monocrystalline silicon, gallium arsenide, and indium phosphide.

Defect review is a process by which a review tool reviews defects acquired by an inspector or inspection tool. Defect review requires the classification of defects and the differentiation, or separation of defect types based on a set of calculated defect attributes. However, current defect classification approaches have a number of limitations.

First, decision trees for defect classification are often manually created using calculated attributes, which is a time consuming process. In this case, a user has to select the best attributes for each node of a decision tree from a large number (e.g., greater than 80) of attributes. In addition, the tree size may become large (e.g., greater than 50 nodes). In addition, the quality of a manually created tree is related to a user's interpretation and understanding of the available attributes and the decision tree creation process. Further, current approaches to measure defect type separability are limited. Prior approaches require a user to find the best attributes for type pairs manually in order to separate two defect types. Moreover, current approaches to classifier monitoring through the production is time consuming and complex.

As such, it would be advantageous to provide a system and method that provides improved defect classification, defect type separability and classifier monitoring that cures the defects identified above.

SUMMARY

A method for defect classification is disclosed. In one illustrative embodiment, the method includes acquiring one or more images of a specimen, the one or more images including a plurality of defect types. In another illustrative embodiment, the method includes receiving a signal from a user interface device indicative of a manual classification of one or more training defects of the specimen based on one or more attributes of the one or more training defects. In another illustrative embodiment, the method includes generating an ensemble learning classifier based on the received manual classification and the attributes of the one or more training defects. In another illustrative embodiment, the method includes generating a confidence threshold for each defect type of the one or more training defects based on a received classification purity requirement. In another illustrative embodiment, the method includes acquiring one or more images including one or more test defects. In another illustrative embodiment, the method includes classifying the one or more test defects with the generated ensemble learning classifier. In another illustrative embodiment, the method includes calculating a confidence level for each of the one or more test defects with the generated ensemble learning classifier. In another illustrative embodiment, the method includes reporting one or more test defects having a confidence level below the generated confidence threshold via the user interface device for manual classification.

A method for determining a defect type pair score is disclosed. In one illustrative embodiment, the method includes acquiring one or more images including a plurality of defect types, the plurality of defect types including a first defect type and at least a second defect type. In another illustrative embodiment, the method includes generating a first ensemble learning classifier for the first defect type and the at least a second defect type. In another illustrative embodiment, the method includes calculating, with the first ensemble learning classifier, a mean decrease in an accuracy index for each of a plurality of attributes associated with the first defect type and the at least a second defect type. In another illustrative embodiment, the method includes identifying a selected number of attributes having the largest mean decrease in accuracy index. In another illustrative embodiment, the method includes generating a second ensemble learning classifier with the identified selected number of attributes having the largest mean decrease in accuracy index. In another illustrative embodiment, the method includes determining a training error associated with the second generated ensemble learning classifier. In another illustrative embodiment, the method includes calculating a defect type pair score associated with the first defect type and the second defect type based on the determined training error.

A method for determining the sufficiency of defect data for classification is disclosed. In one illustrative embodiment, the method includes acquiring a set of defect data from a specimen, the defect data including imagery data associated with a plurality of defects including a plurality of defect types. In another illustrative embodiment, the method includes receiving a signal from a user interface device indicative of a manual classification of the plurality of defects. In another illustrative embodiment, the method includes distributing defect data of at least the first defect type into N groups of data. In another illustrative embodiment, the method includes identifying a group of the N groups of data as containing test data. In another illustrative embodiment, the method includes identifying N-1 groups of data of the distributed defect data not identified as containing test data as containing training data. In another illustrative embodiment, the method includes, for at least a first group of the N groups, incrementally generating a series of classifiers based on the training defect data contained in the N-1 groups of data, wherein each classifier is generated with an incremented percentage of at least a first defect type contained within the training defect data of the N-1 groups of data. In another illustrative embodiment, the method includes determining an accuracy value for each of the series of classifiers for at least the first defect type by applying each of the series of classifiers to the test data not contained in the N-1 groups of the distributed defect data. In another illustrative embodiment, the method includes generating a defect data sufficiency score, for at least the first defect type, based on a generated accuracy score for at least the first group of N groups and at least one additional generated accuracy score for at least one additional group of the N groups.

An apparatus for defect classification is disclosed. In one illustrative embodiment, the apparatus includes an inspection tool. In another illustrative embodiment, the inspection tool includes one or more detectors configured to acquire one or more images of at least a portion of a specimen. In another illustrative embodiment, the apparatus includes a user interface device. In another illustrative embodiment, the apparatus includes a controller. In another illustrative embodiment, the controller includes one or more processors communicatively coupled to the one or more detectors of the inspection tool, wherein the one or more processors are configured to execute a set of program instructions stored in memory. In another illustrative embodiment, the set of program instructions are configured to cause the one or more processors to: receive the one or more images from the one or more detectors of the inspection tool; receive a signal from a user interface device indicative of a manual classification of one or more training defects of the specimen based on one or more attributes of the one or more training defects; generate an ensemble learning classifier based on the received manual classification and the attributes of the one or more training defects; generate a confidence threshold for each defect type of the one or more training defects based on a received classification purity requirement; acquire one or more images including one or more test defects; classify the one or more test defects with the generated ensemble learning classifier; calculate a confidence level for each of the one or more test defects with the generated ensemble learning classifier; and report one or more test defects having a confidence level below the generated confidence threshold via the user interface device for manual classification.

An apparatus for determining one or more defect type pair scores is disclosed. In one illustrative embodiment, the apparatus includes an inspection tool. In another illustrative embodiment, the inspection tool includes one or more detectors configured to acquire one or more images of at least a portion of a specimen. In another illustrative embodiment, the apparatus includes a user interface device. In another illustrative embodiment, the apparatus includes a controller. In another illustrative embodiment, the controller include one or more processors communicatively coupled to the one or more detectors of the inspection tool, wherein the one or more processors are configured to execute a set of program instructions stored in memory. In another illustrative embodiment, the set of program instructions are configured to cause the one or more processors to: receive the one or more images from the inspection tool, the one or more images including a plurality of defect types, the plurality of defect types including a first defect type and at least a second defect type; generate a first ensemble learning classifier for the first defect type and the at least a second defect type; calculate, with the first ensemble learning classifier, a mean decrease in an accuracy index for each of a plurality of attributes associated with the first defect type and the at least a second defect type; identify a selected number of attributes having the largest mean decrease in accuracy index; generate a second ensemble learning classifier with the identified selected number of attributes having the largest mean decrease in accuracy index; determine a training error associated with the second generated ensemble learning classifier; and calculate a defect type pair score associated with the first defect type and the second defect type based on the determined training error.

An apparatus for determining sufficiency of defect data for classification is disclosed. In one illustrative embodiment, the apparatus includes an inspection tool. In another illustrative embodiment, the inspection tool includes one or more detectors configured to acquire one or more images of at least a portion of a specimen. In another illustrative embodiment, the apparatus includes a user interface device. In another illustrative embodiment, the apparatus includes a controller. In another illustrative embodiment, the controller includes one or more processors communicatively coupled to the one or more detectors of the inspection tool, wherein the one or more processors are configured to execute a set of program instructions stored in memory. In another illustrative embodiment, the set of program instructions are configured to cause the one or more processors to: receive the set of defect data from a specimen, the defect data including imagery data associated with a plurality of defects including a plurality of defect types; and generate a defect data sufficiency score, for at least a first defect type, based on a generated accuracy score for at least a first group of N groups of the defect data and at least one additional generated accuracy score for at least one additional group of the N groups of defect data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1 through 4, a method and system for defect classification and analysis are described in accordance with the present disclosure. Embodiments of the present disclosure are directed to the automatic classification of defects provided by an inspection or review tool. In some embodiments, the present disclosure provides for the automatic generation and/or training of an ensemble learning based defect classifier, which provides high purity output on defect classification. In addition, the ensemble learning classifier of the present disclosure provides for classifier monitoring. Additional embodiments of the present disclosure provide for defect type pair separability analysis. In this sense, embodiments of the present disclosure are directed to the determination of a defect type pair score in analyzing whether one or more attributes associated with a pair of defects is sufficient to separate the two defects. Additional embodiments of the present disclosure provide for the determination of the sufficiency of a given set of defect data for the purposes of classifying the given defect data.

Figure 1:
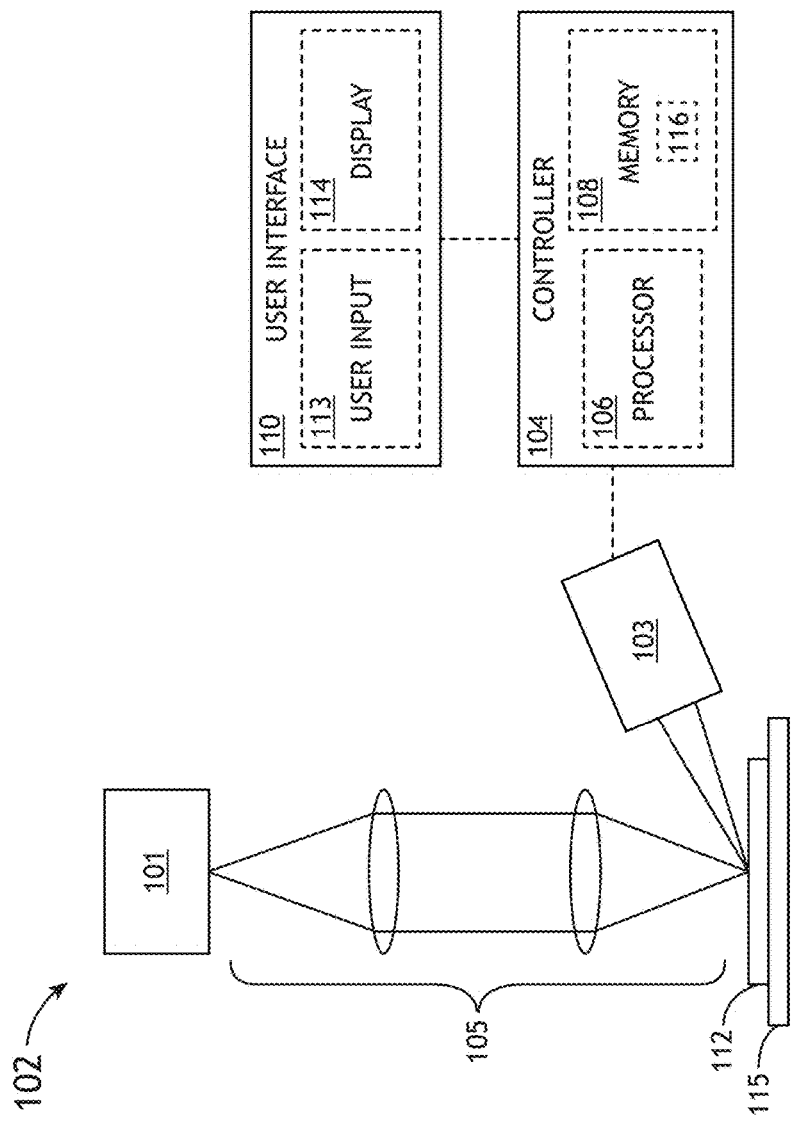
FIG. 1 is a block diagram view of a system for defect classification and analysis, in accordance with one embodiment of the present disclosure.

FIG. 1 illustrates a conceptual block diagram view of a system 100 for defect classification and analysis, in accordance with one or more embodiments of the present disclosure. In one embodiment, the system 100 includes an inspection tool 102. In one embodiment, the inspection tool 102 is configured to measure one or more characteristics of one or more defects disposed on or in the surface of a specimen 112, such as, but not limited to, a semiconductor wafer (e.g., Si wafer).

The inspect tool 102 may include any inspection configuration known in the art capable of defect review. In one embodiment, as depicted in FIG. 1, the inspection tool 102 is an e-beam defect review (EDR) tool. For example, as shown in FIG. 1, the inspection tool 102 includes an electron source 101 (e.g., electron gun), a detector 103 (e.g., secondary electron detector) and any one or more electron-optical components 105 known in the art for carrying out defect review.

It is noted herein that the scope of the present disclosure is not limited to the EDR configuration of system 100 or electron-beam review in general. In one embodiment, the inspection tool 102 may be configured as a light-based inspection tool. For example, the inspection tool 102 may be, but is not required to be, configured for darkfield inspection. By way of another example, the inspection tool 102 may be, but is not required to be, configured for brightfield inspection.

In one embodiment, the inspection tool 102 includes one or more light sources (not shown) to illuminate the specimen 112. The light source may include any light source known in the art. For example, the light source may include a narrow band light source, such as a laser source. By way of another example, the light source may include a broad band light source, such as a discharge lamp or a laser-sustained plasma (LSP) light source. In another embodiment, the light source may be configured to direct light to the surface of the specimen 112 (via various optical components) disposed on the sample stage 115. Further, the various optical components of the inspection tool 102 are configured to direct light reflected, scattered, and/or diffracted from the surface of the specimen 112 to a detector (not shown) of the inspection tool 102. The detector may include any appropriate light detector known in the art. In one embodiment, the detector may include, but is not limited to, a charge coupled device (CCD) detector, a photomultiplier tube (PMT) detector, and the like.

It is noted that for purposes of simplicity the inspection tool 102 has been depicted in a simplified block diagram. This depiction, including the components and geometrical configuration, is not limiting and is provided for illustrative purposes only. It is recognized herein that the inspection tool 102 may include any number of optical elements (e.g., lenses, mirrors, filters, beam splitter and the like), energy sources (e.g., light source or electron source) and detectors (e.g., light detector or secondary electron detector) to carry out the inspection of one or more portions of specimen 112 disposed on the sample stage 115.

In another embodiment, the system 100 includes a controller 104. In one embodiment, the controller 104 is communicatively coupled to the inspection tool 102. For example, the controller 104 may be coupled to the output of detector 103 of the inspection tool 102. The controller 104 may be coupled to the detector 103 in any suitable manner (e.g., by one or more transmission media indicated by the line shown in FIG. 1) such that the controller 104 can receive the output generated by the inspection tool 102.

In one embodiment, the controller 104 includes one or more processors 106 communicatively coupled to the detector 103 and memory 108. In one embodiment, the one or more processors 106 are configured to execute a set of program instructions 116 maintained in memory 108.

The one or more processors 106 of controller 104 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 108). Moreover, different subsystems of the system 100 (e.g., inspection tool 102, display 114, or user interface 110) may include processor or logic elements suitable for carrying out at least a portion of the steps described throughout the present disclosure. Therefore, the above description should not be interpreted as a limitation on the present invention but merely an illustration.

The memory medium 108 may include any storage medium known in the art suitable for storing program instructions executable by the associated one or more processors 106. For example, the memory medium 108 may include a non-transitory memory medium. For instance, the memory medium 108 may include, but is not limited to, a read-only memory, a random access memory, a magnetic or optical memory device (e.g., disk), a magnetic tape, a solid state drive and the like. In another embodiment, it is noted herein that the memory 108 is configured to store one or more results from the inspection tool 102 and/or the output of the various steps described herein. It is further noted that memory 108 may be housed in a common controller housing with the one or more processors 106. In an alternative embodiment, the memory 108 may be located remotely with respect to the physical location of the processors 106 and controller 104. For instance, the one or more processors 106 of controller 104 may access a remote memory (e.g., server), accessible through a network (e.g., internet, intranet and the like). In another embodiment, the memory medium 108 stores the program instructions 116 for causing the one or more processors 106 to carry out the various steps described through the present disclosure.

In another embodiment, the controller 104 of the system 100 may be configured to receive and/or acquire data or information from other systems (e.g., inspection results from an inspection system or metrology results from a metrology system) by a transmission medium that may include wireline and/or wireless portions. In this manner, the transmission medium may serve as a data link between the controller 104 and other subsystems of the system 100. Moreover, the controller 104 may send data to external systems via a transmission medium (e.g., network connection).

In another embodiment, the system 100 includes a user interface 110. In one embodiment, the user interface 110 is communicatively coupled to the one or more processors 106 of controller 104. In another embodiment, the user interface device 110 may be utilized by controller 104 to accept selections and/or instructions from a user. In some embodiments, described further herein, a display 114 may be used to display data to a user (not shown). In turn, a user may input, via user input device 113, a selection and/or instructions responsive to data displayed to the user via the display device 114.

The user interface device 110 may include any user interface known in the art. For example, the user input device 113 of the user interface 110 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface device, those skilled in the art should recognize that a large number of touchscreen interface devices may be suitable for implementation in the present invention. For instance, the display device 114 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device 113 may include, but is not limited to, a bezel mounted interface.

The display device 114 may include any display device known in the art. In one embodiment, the display device 114 may include, but is not limited to, a liquid crystal display (LCD). In another embodiment, the display device 114 may include, but is not limited to, an organic light-emitting diode (OLED) based display. In another embodiment, the display device 114 may include, but is not limited to a CRT display. Those skilled in the art should recognize that a variety of display devices may be suitable for implementation in the present invention and the particular choice of display device 114 may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present invention.

In one embodiment, the one or more processors 106 of controller 104 are programmed to carry out one or more steps of a defect classifier generation and defect classification procedure. In one embodiment, the one or more processors 106 may automatically generate an ensemble learning classifier based on manually classified training defects and calculated attributes. In addition, the one or more processors 106 may automatically calculate a per-type confidence threshold in accordance with a received user-selected purity requirement. The one or more processors 106 may calculate a confidence measure for each test defect (e.g., test defect of a production wafer). In addition, in production, the one or more processors 106 may report defects having a confidence level less than the confidence threshold to the user interface device 110 for manual review by a user.

In another embodiment, the one or more processors 106 of controller 104 are programmed to carry out one or more steps of a defect type pair score determination procedure. In one embodiment, the defect type pair score is calculated, by the one or more processors 106, on the defect types of a defect type pair. In this regard, a defect type pair score is calculated between any two defect types. For instance, in the case where a set of defect data includes defect types A, B and C, the one or more processors 106 may calculate the following: a defect type pair score between defect type A and B; a defect type pair score between B and C; and a defect type pair score between A and C. In another embodiment, for defect pair data, an ensemble learning classifier (e.g., random forest classifier) may be trained and the mean accuracy decrease index for each attribute may be calculated. After sorting of the mean accuracy decrease index, the first N attributes are used to train an additional random forest classifier, where training error (e.g., out-of-bag (OOB) error) is calculated. A type pair having a score lower than a pre-defined threshold indicates that the attributes are inadequate for separating the two defect types.

In another embodiment, the one or more processors 106 are programmed to carry out one or more steps of a defect data sufficiency determination procedure. In one embodiment, the one or more processors 106 receive manually classified defect data and attributes, which are distributed into N groups (e.g., folders). In addition, defect data of the N-1 groups (e.g., folders) may be used as training data, with the remaining group used as test data. In calculating the score for a particular defect type, the one or more processors 106 may incrementally increase the number of defects of the particular defect type in the training data (e.g., incrementally increase from 10% to 100%). In this case, the one or more processors 106 may build a classifier at each incremental step and apply it to the test data. An accuracy score is then calculated based on the deviation of the accuracy at each incremental defect content step. A data sufficiency score is then generated by repeating this process for each group (e.g., folder) and averaging the results across all the data groups (e.g., folders). This process may then be repeated for each defect type.

The embodiments of the system 100 illustrated in FIG. 1 may be further configured as described herein. In addition, the system 100 may be configured to perform any other step(s) of any of the method embodiment(s) described herein.

Figure 2:
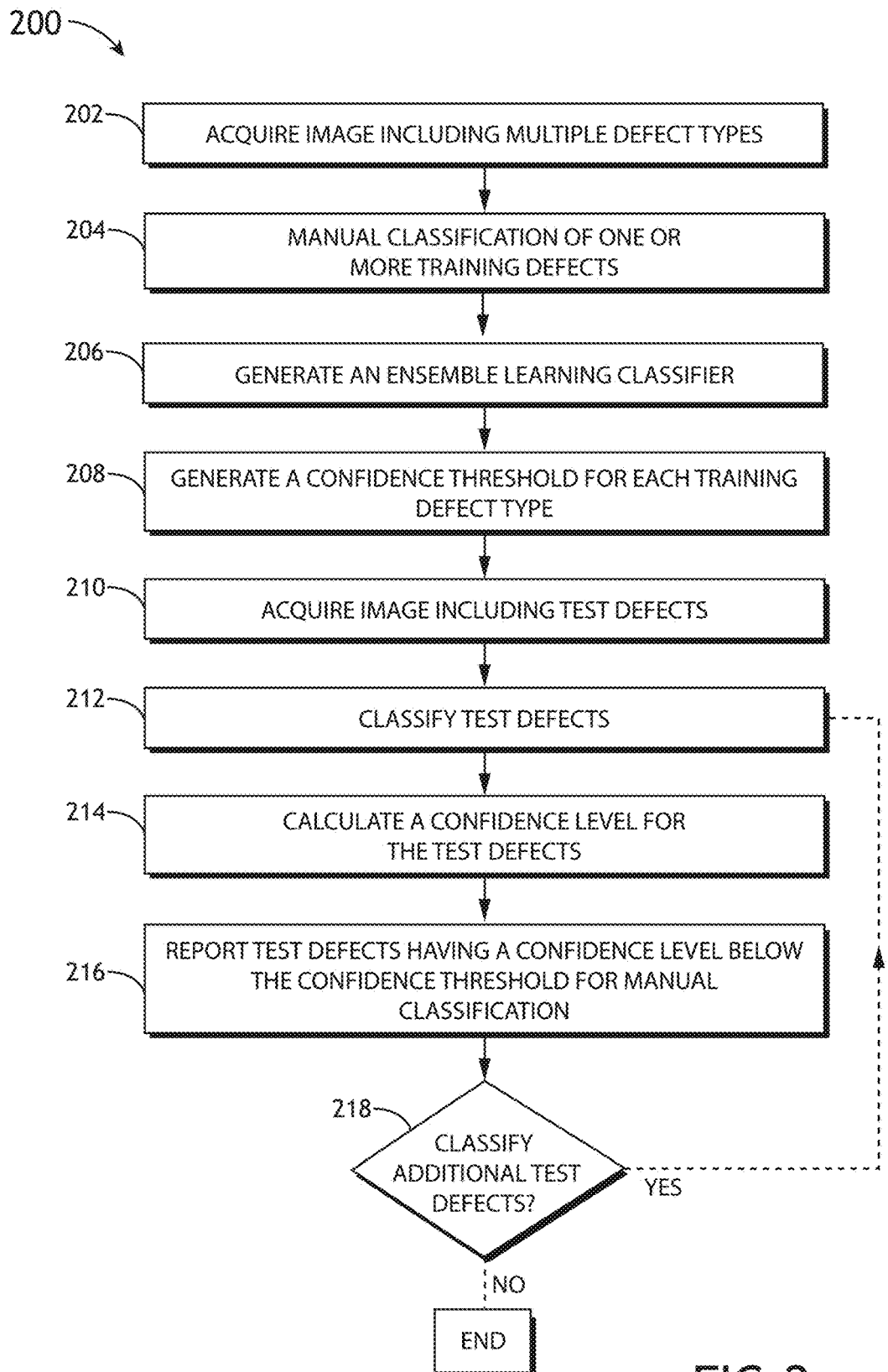
FIG. 2 is a flow diagram illustrating steps performed in a method for defect classification, in accordance with one embodiment of the present disclosure.

FIG. 2 is a flow diagram illustrating steps performed in a method 200 of defect classification, in accordance with one embodiment of the present disclosure. It is noted herein that the steps of method 200 may be implemented all or in part by the system 100. It is further recognized, however, that the method 200 is not limited to the system 100 in that additional or alternative system-level embodiments may carry out all or part of the steps of method 200.

In step 202, one or more images 107 including multiple defect types are acquired. In one embodiment, as shown in FIG. 1, at least a portion of the defects contained in one or more images 107 of a specimen 112 are capable of serving as training defects. In one embodiment, the inspection tool 102 acquires the one or more images 107 and transmits the one or more images 107 to the one or more controllers 104. It is further contemplated that the one or more images 107 may be stored in memory 108 and used for later analysis.

In step 204, a manual classification of the one or more training defects is carried out. For example, a user may manually classify the training defects contained in the acquired one or more images 107. For instance, a user may manually classify the training defects via user interface device 110 based on one or more attributes of the one or more training defects. In turn, the user interface device 110 may transmit a signal indicative of a manual classification of the one or more training defects of the specimen 112 to the one or more processors 106 of controller 104. In another embodiment, the controller 104 may receive the manual classification of the training defects and store the result in memory 108. The one or more attributes used to carry out the classification of step 204 include any one or more attributes that can be derived from a defect inspection or review tool. For example, the one or more attributes may include, but are not limited to, image feature amounts, defect coordinates, composition analysis results, manufacture initiation history data, or machine QC (Quality Control) data. Further, in some embodiments, the one or more attributes may be obtained from multiple types of defect inspection tools or systems, such as, but not limited to, an optical or SEM foreign matter inspection machine, a pattern inspection machine, a defect review machine, SPM, or an elemental analysis machine. Attributes suitable for classification of defects are described in U.S. Pat. No. 7,602,962, issued on Oct. 13, 2009, which is incorporated herein by reference in the entirety.

In one embodiment, the attributes of the one or more training defects may be processed by an automatic classification function, such as, but not limited to, a real time automatic classification (RT-ADC) to classify one or more training defects. It is noted that the utilization of RT-ADC provides for a "rough" automatic classification of training defects without sacrificing high processing speeds. Real time automatic classification is described generally in U.S. Pat. No. 7,602,962, issued on Oct. 13, 2009, which is incorporated above by reference in the entirety.

In step 206, an ensemble learning classifier is generated. In one embodiment, the ensemble learning classifier is generated, or trained, based on the manual classification of training defects of step 204 and the one or more attributes. In one embodiment, the one or more processors 106 of controller 104 may generate, or train, the ensemble learning classifier and store the ensemble learning classifier in memory 108. In one embodiment, the ensemble learning classifier is a random forest classifier. The one or more processors 106 may train a random forest classifier that operates by constructing multiple decision trees during a training period and outputting a class that is the mode of the classes of the individual trees. In this regard, the one or more processors 106 may use the manual classification of the training defects and the associated attributes to train a random forest classifier. The implementation of a random forest classifier is described generally by Breiman in *Random Forests*, Machine Learning, Vol. 45, Issue 1, pp. 5-32 (2001), which is incorporated herein by reference in the entirety. Random forests are also discussed by Kulkarni et al. in *Random Forest Classifiers: A Survey and Future Research Directions*, International Journal of Advanced Computing, Vol. 36, Issue 1, pp. 1144-1153 (2013), which is incorporated herein by reference in the entirety.

In another embodiment, the ensemble learning classifier is a support vector machine (SVM). The one or more processors 106 may use the manual classification of the training defects and the associated attributes to train a SVM-based classifier. The implementation of a SVM-based classifier is described generally by Xie et al. in *Detection and Classification of Defect Patterns in Optical Inspection Using Support Vector Machines*, Intelligent Computing Theories Lecture Notes in Computer Science, Vol. 7995, pp. 376-384 (2013), which is incorporated herein by reference in the entirety.

In step 208, a confidence threshold for each defect type of the one or more training defects is generated. In one embodiment, the one or more processors 106 generate a confidence threshold for each defect type of the one or more training defects based on a confidence threshold received from user interface 110. In another embodiment, the confidence threshold is generated by one or more processors 106 via a cross-validation procedure. In another embodiment, the confidence threshold may be manually set via user input (e.g., user input via user interface 110).

For example, a user may select a purity requirement, or purity level, via user interface 110. In turn, the user interface device 110 may transmit a signal indicative of the selected purity requirement to the one or more processors 106 of controller 104. The controller 104 may then store the selected purity requirement in memory 108. It is noted herein that the received purity requirement may be a function of a variety of parameters. For instance, the received purity requirement may depend on a user preference and/or the expected defect types present on a given production wafer. For instance, a user may select a single classification purity requirement (e.g., 90%) on all defect types. In another instance, a user may select a first classification purity requirement (e.g., 90%) on a first defect type and a second classification purity requirement (e.g., 85%) on a second defect type and so on. It is further noted that in some embodiments a heightened purity requirement correlates to a higher confidence threshold. In this regard, the one or more processors 106 of controller 104 automatically adjust the confidence threshold in response to a user input via user interface 110.

In step 210, one or more images including one or more test defects are acquired. In one embodiment, the one or more test defects are disposed on a different specimen (e.g., wafer) than the one or more training defects. For example, the inspection tool 102 may acquire imagery data from a production specimen 112 (e.g., wafer), whereby the controller 104 extracts one or more test defects from the given imagery data. Further, the training defects, used to generate the ensemble learning classifier, may be extracted from imagery data from a training specimen 112. In another embodiment, the one or more test defects and the one or more training defects of the present disclosure are disposed on the same specimen 112 (e.g., wafer). In this regard, the imagery data (e.g., one or more images) used to extract the training defects is also used to acquire the one or more test defects of the present disclosure.

In step 212, the one or more test defects are classified with the generated ensemble learning classifier. In one embodiment, the one or more processors 106 may retrieve the ensemble learning classifier stored in memory 108 (see step 206) and apply the ensemble learning classifier to one or more test defects acquired in step 210. In this regard, once the ensemble learning classifier has been trained in step 206 it may then be used to classify one or more test defects contained in imagery data acquired from a given sample (e.g., production wafer).

In step 214, a classification confidence level is calculated for each of the one or more test defects. In one embodiment, the one or more processors 106 calculates a confidence level for each, or at least some, of the one or more test defects with the ensemble learning classifier trained in step 206. It is noted herein that the confidence level of the classification for the one or more defects may be calculated in any manner known in the art. In one embodiment, the one or more processors 106 calculate the confidence level of the one or more test defects via a voting procedure. For example, in the case of a random forest classifier, each tree of the random forest classifier has a classification output referred to herein as a "vote." In this case, the confidence level for the one or more test defects may be, but is not required to be, calculated via a major two vote scheme given by:

$$\text{Confidence} = \frac{\text{Majority Vote}}{\text{Sum of Major Two Vote}} \sqrt{\frac{\text{Sum of Major Two Vote}}{\text{Total Vote}}}$$

In step 216, the one or more test defects having a confidence level below the generated confidence threshold are reported via the user interface device 110 for manual classification. In one embodiment, the one or more processors 106 compare the calculated confidence level of step 214 to the generated confidence threshold of step 208. In the case where the calculated confidence level is above the confidence threshold, the classification is accepted and stored in memory 108. In the case where the calculated confidence level is below the confidence threshold, the given one or more test defects are indexed and reported to a user for manual classification. For example, in the case where the calculated confidence level is below the confidence threshold for one or more test defects, the imagery data and/or known attributes associated with the given one or more test defects may be displayed on display 114. In this regard, a user may perform a manual classification of these test defects via user input device 113. In turn, the user interface device 110 may then transmit the manual calculation of these test defects and store them in memory 108. In this regard, the automatically classified test defects (classified with the ensemble learning classifier) and the manually classified test defects (classified via user input) may then be aggregated into an integrated database for review and/or analysis.

In addition, after the one or more test defects have been analyzed, the method may move to step 218, whereby the steps 212-216 are repeated if additional test defects require analysis. In the case where no additional test defects require analysis, the process ends.

In another embodiment, a confidence level of each defect type of the one or more test defects may be used by the one or more processors 106 to monitor the effectiveness of the ensemble learning classifier generated by system 100. For example, an average confidence level for each defect type may be used by the one or more processors 106 to monitor the ensemble learning classifier of system 100. In this regard, the average confidence level associated with the classification of each defect type may be used to monitor the ensemble learning classifier of system 100 by indicating the Pareto change of the defect types and/or the creation of a new defect type in a wafer production process.

Figure 3:
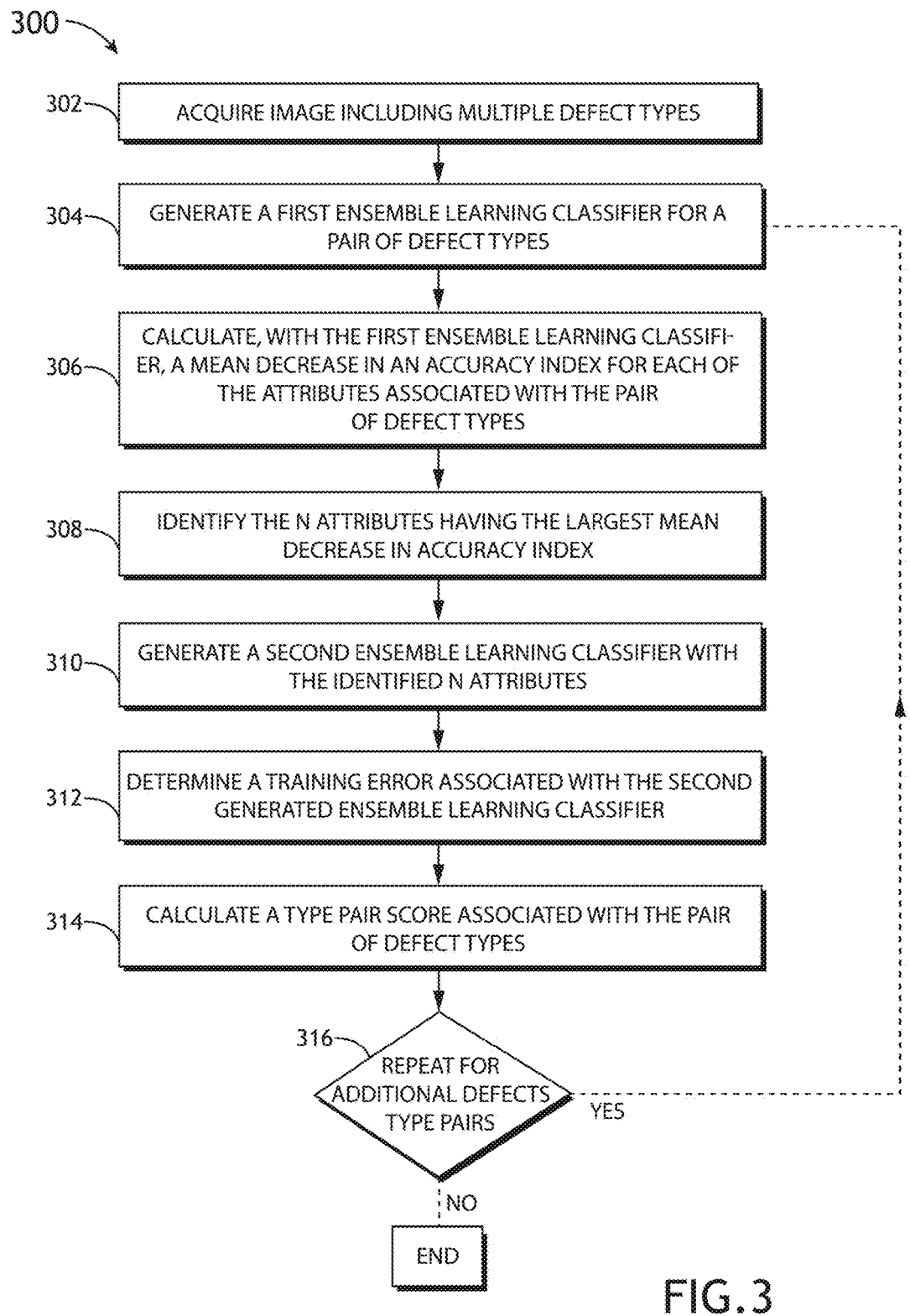
FIG. 3 is a flow diagram illustrating steps performed in a method for determining a defect type pair score, in accordance with one embodiment of the present disclosure.

FIG. 3 is a flow diagram illustrating steps performed in a method 300 of determining a defect type pair score, in accordance with one embodiment of the present disclosure. It is noted herein that the steps of method 300 may be implemented all or in part by the system 100. It is further recognized, however, that the method 300 is not limited to the system 100 in that additional or alternative system-level embodiments may carry out all or part of the steps of method 300. It is further noted that the embodiments and examples described in the context of method 200 should be interpreted to extend to method 300 (and vice versa) unless otherwise noted.

In step 302, one or more images 107 are acquired including multiple defect types. In one embodiment, the multiple defect types include a first defect type and at least a second defect type. In this regard, the first defect type and the second defect type form a defect type pair. It is noted herein that a given set of inspection data may include a high number of defect types. In this regard, any combination of two different defect types may form a defect type pair.

In step 304, a first ensemble learning classifier is generated, or trained, for a pair of defect types. In one embodiment, the one or more processors 106 may train a first ensemble learning classifier for a pair of defect types. For example, the one or more processors 106 may generate a first ensemble learning classifier for a first defect type (A) and a second defect type (B). By way of another example, the one or more processors 106 may generate a first ensemble learning classifier for a second defect type (B) and a third defect type (C). By way of another example, the one or more processors 106 may generate a first ensemble learning classifier for a first defect type (A) and a third defect type (C). It is noted herein that the labeling of the defect types above is not limiting and is provided merely for illustrative purposes. Further, the various defect types are not limited to the examples provided above and may include any pair of defect types present in the acquired defect data.

The first ensemble learning classifier may include any ensemble learning classifier known in the art. For example, as discussed previously herein, the first ensemble learning classifier may include, but is not limited to, a random forest classifier or a SVM-based classifier. It is further noted that the one or more processors 106 of controller 104 may train the ensemble learning classifier (e.g. random forest classifier) by randomly selecting a subset of the training data and then randomly selecting a subset of the training attribute multiple times to create multiple decision trees.

In step 306, a mean decrease in an accuracy index for each of the attributes associated with the pair of defect types is calculated with the first ensemble learning classifier. For example, the one or more processors 106 may calculate, with the first ensemble classifier, a mean decrease in the accuracy index for each (or at least some) of the attributes associated with a pair of defect types. For instance, the one or more processors 106 may calculate a mean decrease in the accuracy index for each (or at least some) of the attributes associated with a first defect type and a second defect type (or a second defect type and a third defect type, a first defect type and a third defect type and so on) using the first ensemble learning classifier.

In step 308, the N attributes having the largest mean decrease in accuracy index are identified. It is noted herein that a mean decrease in an accuracy index for a pair of defect types (e.g., first defect type/second defect type pair) represents a measure of the attributes which are best suited (or at least sufficiently suited) to separate the first defect type and the second defect type of the given pair of defect types.

In one embodiment, the one or more processors 106 may sort the mean decrease in accuracy index and then identify a selected number (N) having the largest mean decrease in accuracy index. In another embodiment, the one or more processors 106 may sort the accuracy index in a selected fashion (e.g., based on mean decrease, median decrease and etc.) and identify a selected number of the attributes displaying a selected feature (e.g., largest mean decrease, largest median decrease, a selected number from the N attributes having the largest mean or median decrease in accuracy). It is noted herein that the present disclosure and method 300 are not limited to the statistical analysis of step 308, which is provided merely for illustrative purposes. Rather, it is noted that step 308 should be interpreted to extend to any statistical analysis process used to identify a sub-set of the attributes associated with a decrease in accuracy index.

In step 310, a second ensemble learning classifier is generated, or trained, using the identified attributes of step 308. In one embodiment, the one or more processors 106 may train a second ensemble learning classifier using the N attributes having the largest mean decrease in accuracy index. The second ensemble learning classifier may include any ensemble learning classifier known in the art. For example, as discussed previously herein, the second ensemble learning classifier may include, but is not limited to, a random forest classifier or a SVM-based classifier.

In step 312, a training error associated with the second generated ensemble learning classifier is determined. In one embodiment, the one or more processors 106 determine a training error associated with the second generated ensemble learning classifier. For example, the one or more processors 106 may determine an out-of-bag (OOB) training error associated with the second generated ensemble learning classifier. The determination of OOB error is generally discussed by Breiman in *Random Forests*, Machine Learning, Vol. 45, Issue 1, pp. 5-32 (2001), which is incorporated above by reference in the entirety; and Kulkarni et al. in *Random Forest Classifiers: A Survey and Future Research Directions*, International Journal of Advanced Computing, Vol. 36, Issue 1, pp. 1144-1153 (2013), which is incorporated above by reference in the entirety.

In step 314, a type pair score associated with the pair of defect types is calculated. In one embodiment, the one or more processors 106 may calculate a type pair score associated with the pair of defect types based on the training error determination of step 312. For example, the one or more processors 106 may calculate a type pair score associated with the first defect type and the second defect type (or a second defect type and a third defect type, a first defect type and a third defect type and so on) based on the training error determination of step 312. For example, in the case where OOB error is used to calculate the training error, the defect type pair score may be calculated using the following relationship:

$$\text{Type Pair Score} = 1 - OOB \text{ error}$$

In another embodiment, the one or more processors 106 may compare the calculated type pair score to a predefined threshold. In another embodiment, in the event that the type pair score is lower than a predefined threshold (e.g., selected via user input), the one or more processors 106 may provide an indication that the attributes selected in step 308 are insufficient to separate the defect classes of the defect class pair (e.g., first defect class and second defect class). Further, the one or more processors 106 may report the type pair score to the user via display 114 of the user interface device 110 or to memory 108 of controller 104.

In another embodiment, the controller 104 may monitor the type pair score throughout a semiconductor device production process. It is noted herein that a reduction in the type pair score may indicate the formation of one or more new defect classes in the given specimen. In this regard, monitoring the type pair score provides an indication of whether a new defect class has formed during the production process.

Further, in the case where additional defect type pairs require analysis step 316 may cause the method to repeat steps 304-314 to determine a type pair score for additional defect type pairs. In the case where no additional defect type pairs require analysis, the method 300 ends.

Figure 4:
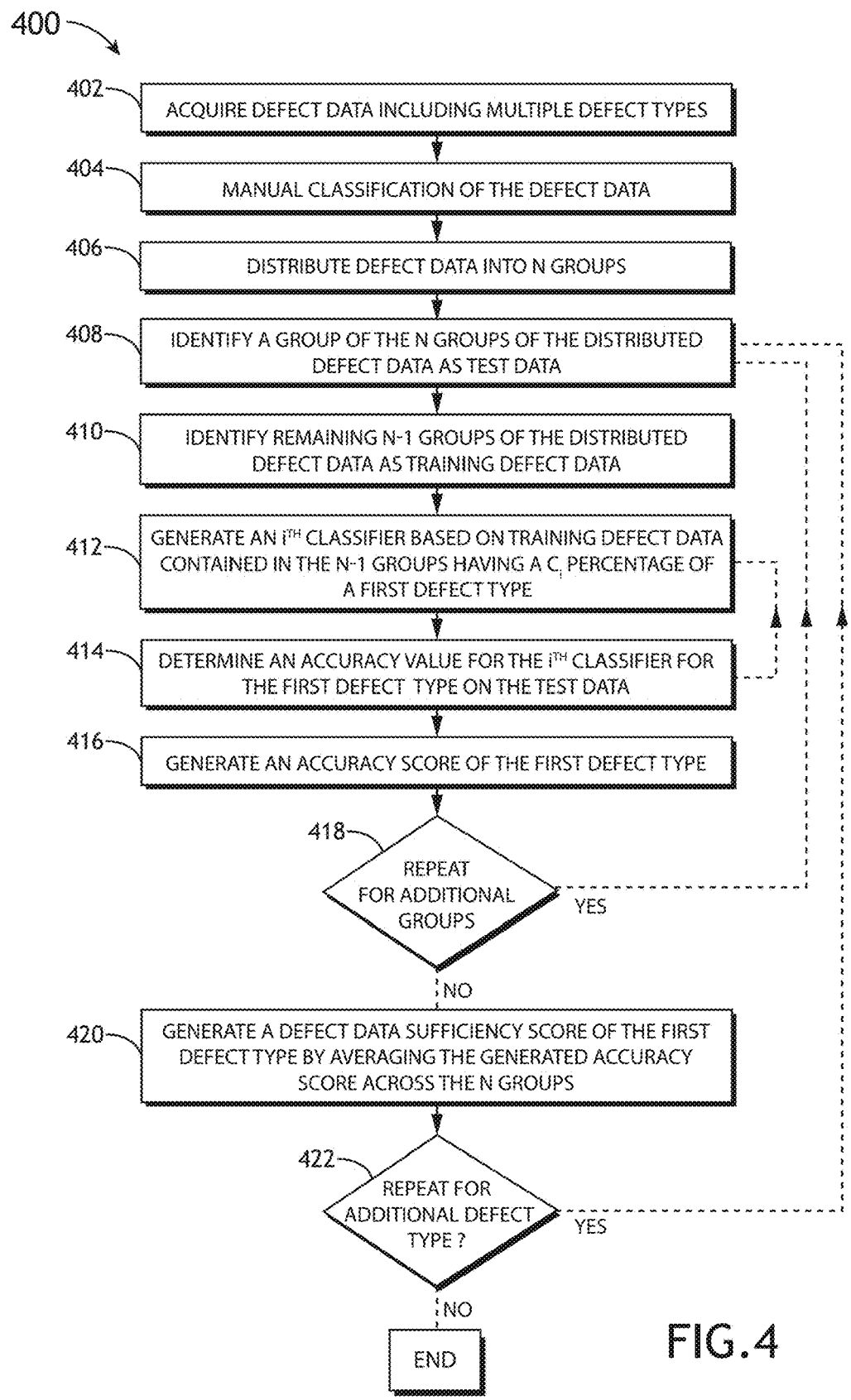
FIG. 4 is a flow diagram illustrating steps performed in a method for a determining defect data sufficiency score, in accordance with one embodiment of the present disclosure.

FIG. 4 is a flow diagram illustrating steps performed in a method 400 of determining a defect data sufficiency score, in accordance with one embodiment of the present disclosure. It is noted herein that the steps of method 400 may be implemented all or in part by the system 100. It is further recognized, however, that the method 400 is not limited to the system 100 in that additional or alternative system-level embodiments may carry out all or part of the steps of method 400. It is further noted that the embodiments and examples described in the context of methods 200 and 300 should be interpreted to extend to method 400 (and vice versa) unless otherwise noted.

In step 402, one or more images 107 are acquired including multiple defect types. In one embodiment, the inspection tool 102 acquires one or more images 107 and transmits the one or more images 107 to the one or more controllers 104.

In step 404, a manual classification of the one or more defect data is carried out. For example, a user may manually classify the defects of the defect data contained in the one or more images 107. For instance, a user may manually classify the defects via user interface device 110 based on one or more attributes of the one or more defects. In turn, the user interface device 110 may transmit a signal indicative of the manual classification of the one or more defects of the specimen 112 to the one or more processors 106 of controller 104. In another embodiment, the controller 104 may receive the manual classification of the defects and store the result in memory 108. The one or more attributes used to carry out the classification of step 404 include any one or more attributes that can be derived from a defect inspection or review tool. For example, the one or more attributes may include, but are not limited to, image feature amounts, defect coordinates, composition analysis results, manufacture initiation history data, and machine QC (Quality Control) data. Further, in some embodiments, the one or more attributes may be obtained from multiple types of defect inspection tools or systems, such as, but not limited to, an optical or SEM foreign matter inspection machine, a pattern inspection machine, a defect review machine, SPM, or an elemental analysis machine. Attributes suitable for classification of defects are described in U.S. Pat. No. 7,602,962, issued on Oct. 13, 2009, which is incorporated previously herein by reference in the entirety.

In one embodiment, the attributes of the one or more training defects may be processed by an automatic classification function, such as, but not limited to, a real time automatic classification (RT-ADC) to classify one or more training defects. It is again noted that the utilization of RT-ADC provides for a "rough" automatic classification of training defects without sacrificing high processing speeds. Real time automatic classification is again described generally in U.S. Pat. No. 7,602,962, issued on Oct. 13, 2009, which is incorporated above by reference in the entirety.

In step 406, the defect data is distributed into N groups. For example, following the manual classification of defect data in step 404, the one or more processors 106 may distribute the defect data into N groups. For instance, the number of groups N may be selected via user input. In another embodiment, the defect data may be randomly distributed into N groups. Further, it is recognized herein that the distribution of defect data into N groups may be carried out by distributing and storing the defect data into a set of N folders maintained in memory 108 (or another memory).

In step 408, one of the N groups of defect data is identified as test defect data. In step 410, the remaining N-1 groups of defect data are identified as training defect data. For example, the one or more processors 106 may identify, or select, one of the groups of distributed defect data to serve as test data, while the remaining N-1 groups serves a training data. Once the N-1 groups of defect data have been identified as training defect data the N-1 groups of data may be combined and used for analysis in the following steps.

In steps 412 and 414, for at least a first group of the N groups of defect data, a series of classifiers and the corresponding accuracy value for each classifier are incrementally generated. It is noted that these steps may be repeated for additional groups (e.g., folders) of the N groups via step 418 discussed further herein. In step 412, an $i^{th}$ classifier is generated based on the training data contained in the N-1 groups for the case where the training data contains a selected percentage ($C_i$) of a first defect type. In this regard, a series of classifiers may be incrementally generated for each percentage $C_i$ of the first defect type. For example, each classifier is generated with an incremented percentage of at least a first defect type contained within the training defect data of the N-1 groups of data. For instance, a series of classifiers may be generated at each 10% increment of first defect percentage from 0 to 100%. For example, a first classifier may be generated at a first defect percentage ($C_1$) of 10%, a second classifier may be generated at a second defect percentage ($C_2$) of 20%, a third classifier may be generated at a third defect percentage ($C_3$) of 30%, a fourth classifier may be generated at a fourth defect percentage ($C_4$) of 40%, a fifth classifier may be generated at a fifth defect percentage ($C_5$) of 50%, a sixth classifier may be generated at a sixth defect percentage ($C_6$) of 60%, a seventh classifier may be generated at a seventh defect percentage ($C_7$) of 70%, an eighth classifier may be generated at an eighth defect percentage ($C_8$) of 80%, a ninth classifier may be generated at a ninth defect percentage ($C_9$) of 90% and a tenth classifier may be generated at a tenth defect percentage ($C_{10}$) of 100%. It is noted that method 400 is not limited to these increments and the present disclosure should be interpreted to extend to any incrementing standard (e.g., 2%, 5%, 10%, 20% increments and so on). For instance, classifiers may be generated only for the cases where the first defect percentage is 80%, 90% and 100%.

It is noted herein that the classifiers generated in this step may include any classifier known in the art and is not limited to a ensemble learning classifier. In one embodiment, one or more of the generated classifiers are ensemble learning classifiers (e.g., random forest classifiers, SVM-based classifiers and the like). In another embodiment, one or more of the generated classifiers are single decision tree classifiers or multiple decision tree classifiers (e.g., super classifier).

In step 414, an accuracy value is determined for each of the $i^{th}$ classifiers for the first defect type on the test data. For example, the one or more processors 106 may determine an accuracy value for each of the series of classifiers generated in step 412 for at least the first defect type. In this regard, the one or more processors may determine an accuracy value for each of the classifiers by applying each of the classifiers to the test data not contained in the N-1 groups of the distributed defect data.

As noted previously herein, steps 412 and 414 may be repeated for each increment of the first defect type percentage. Once each of the classifiers and corresponding accuracy values have been calculated for each Ci percentage of the first defect type (or additional defect types in further iterations—see step 422) the method 400 moves to step 416.

In step 416, an accuracy score is generated for the first defect type. In one embodiment, the one or more processors 106 generate an accuracy score for the first defect type by aggregating the accuracy values calculated in step 414 for each Ci percentage of the first defect type. For example, the accuracy score may be generated by the one or more processors 106 by determining a statistical measure of the deviation of the accuracy values associated with the Ci percentages. In one embodiment, the one or more processors 106 may determine the accuracy score of the first defect type by via the following relationship:

Accuracy Score=1−$s$*std(accuracy values of $C_i$ percentages)

where s represents a scaling factor and std represents the standard deviation of the accuracy values of the $C_i$ percentages of the first defect type acquired in step 414.

In step 418, the method 400 may repeat steps 408-416 for each group of N groups. In this regard, the method may calculate an accuracy score for each of the N groups. Once the method 400 has performed the accuracy score determination for each of the N groups, the method moves to step 420.

In step 420, a data sufficiency score for the first defect type is calculated. For example, the one or more processors 106 may calculate a data sufficiency score by aggregating the accuracy score found in step 416 for each of the N groups and then calculating an average accuracy score for the N groups. In this regard, the data sufficiency score for the first defect type may take the form:

$$\text{Data Sufficiency Score} = \frac{1}{N} \sum_{j=1}^{N} \text{Accuracy Score}_j$$

Once the method 400 has performed the data sufficiency score for the first defect class, the method 400 may then move to step 422.

In step 422, the method 400 may repeat steps 408-420 for one or more additional defect classes. In this regard, the method may calculate a data sufficiency score (step 420) for any number of defect classes. Once all of the desired defect classes have been scored the method 400 then ends.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A method for determining the sufficiency of defect data for classification comprising:
   acquiring a set of defect data from a specimen, the defect data including imagery data associated with a plurality of defects including a plurality of defect types;
   receiving a signal from a user interface device indicative of a manual classification of the plurality of defects;
   distributing defect data of at least a first defect type into N groups of data;
   identifying a group of the N groups of data as containing test data;
   identifying N-1 groups of data of the distributed defect data not identified as containing test data as containing training data;
   for at least a first group of the N groups, incrementally generating a series of classifiers based on the training defect data contained in the N-1 groups of data, wherein each classifier is generated with an incremented percentage of at least the first defect type contained within the training defect data of the N-1 groups of data;

determining an accuracy value for each of the series of classifiers for at least the first defect type by applying each of the series of classifiers to the test data not contained in the N-1 groups of the distributed defect data; and generating a defect data sufficiency score, for at least the first defect type, based on a generated accuracy score for at least the first group of N groups and at least one additional generated accuracy score for at least one additional group of the N groups.

2. The method of claim 1, wherein the generating a defect data sufficiency score, for at least the first defect type, based on a generated accuracy score for at least the first group of N groups and at least one additional generated accuracy score for at least one additional group of the N groups comprises:

generating an accuracy score for at least the first group of N groups based on the accuracy values determined for each of the series of classifiers for at least the first defect type;

generating an accuracy score for at least an additional group of N groups based on the accuracy values determined for each of a series of additional classifiers for at least the first defect type; and generating the defect data sufficiency score, for at least the first defect type, based on the generated accuracy score for at least the first group of N groups and the at least one additional generated accuracy score for the at least one additional group of the N groups.

3. The method of claim 1, further comprising:

generating a defect data sufficiency score, for at least an additional defect type, based on a generated accuracy score for at least the first group of N groups and at least one additional generated accuracy score for at least one additional group of the N groups.

4. The method of claim 1, wherein the N-1 groups of training data are aggregated into a single data group.

5. The method of claim 1, wherein incrementally generating a series of classifiers based on the training defect data contained in the N-1 groups comprises:

incrementally generating a series of ensemble learning classifiers based on the training defect data contained in the N-1 groups.

6. The method of claim 5, wherein incrementally generating a series of classifiers based on the training defect data contained in the N-1 groups comprises:

incrementally generating a series of random forest classifiers based on the training defect data contained in the N-1 groups.

7. The method of claim 1, wherein the distributing defect data of at least the first defect type into N groups comprises:

randomly distributing defect data of at least the first defect type into N groups.

8. The method of claim 1, wherein the one or more training defects are manually classified with a real-time automatic defect classification (RT-ADC) scheme applied to the one or more attributes.

9. An apparatus for determining sufficiency of defect data for classification comprising:

an inspection tool, the inspection tool including one or more detectors configured to acquire one or more images of at least a portion of a specimen;

a user interface device; and a controller, the controller including one or more processors communicatively coupled to the one or more detectors of the inspection tool, wherein the one or more processors are configured to execute a set of program instructions stored in memory, the set of program instructions configured to cause the one or more processors to:

receive a set of defect data from the specimen, the defect data including imagery data associated with a plurality of defects including a plurality of defect types; and generate a defect data sufficiency score, for at least a first defect type, based on a generated accuracy score for at least a first group of N groups of the defect data and at least one additional generated accuracy score for at least one additional group of the N groups of defect data.

10. The apparatus of claim 9, wherein the one or more processors are configured to generate a defect data sufficiency score, for at least a first defect type, based on a generated accuracy score for at least a first group of N groups of the defect data and at least one additional generated accuracy score for at least one additional group of the N groups of defect data by:

generating an accuracy score for at least the first group of N groups based on accuracy values determined for each of a series of classifiers for at least the first defect type;

generating an accuracy score for at least the additional group of N groups based on accuracy values determined for each of a series of additional classifiers for at least the first defect type; and generating a defect data sufficiency score, for at least the first defect type, based on the generated accuracy score for at least the first group of N groups and the at least one additional generated accuracy score for the at least one additional group of the N groups.

11. The apparatus of claim 9, wherein the inspection tool comprises:

an electron beam defect review tool.

12. The apparatus of claim 9, wherein the inspection tool comprises:

a darkfield inspection tool.

13. The apparatus of claim 9, wherein the inspection tool comprises:

a brightfield inspection tool.

14. The apparatus of claim 10, wherein at least one of the series of classifiers comprises:

a random forest classifier.

15. The apparatus of claim 14, wherein the one or more processors are further configured to:

generate a defect data sufficiency score, for at least an additional defect type, based on a generated accuracy score for at least the first group of N groups and at least one additional generated accuracy score for at least one additional group of the N groups.

* * * * *